United States Patent [19]

Lambert

[11] Patent Number: 4,478,630
[45] Date of Patent: Oct. 23, 1984

[54] BOTTOM PLATE RETAINER

[75] Inventor: Scott M. Lambert, Enfield, Conn.

[73] Assignee: Emhart Industries, Inc., Farmington, Conn.

[21] Appl. No.: 472,299

[22] Filed: Mar. 4, 1983

[51] Int. Cl.³ ............................................. C03B 9/00
[52] U.S. Cl. ...................................... 65/242; 65/240; 425/182
[58] Field of Search ................. 65/242, 240, 238, 239; 425/182, 195

[56] References Cited

U.S. PATENT DOCUMENTS

| | | | |
|---|---|---|---|
| 800,352 | 9/1905 | Bard | 65/242 |
| 1,859,074 | 5/1932 | Cramer | 65/239 |
| 3,071,946 | 1/1963 | Watson et al. | 65/242 |
| 4,339,264 | 7/1982 | Dahms | 65/240 |

Primary Examiner—S. Leon Bashore
Assistant Examiner—Michael K. Boyer
Attorney, Agent, or Firm—H. Samuel Kieser

[57] ABSTRACT

A bottom plate retainer for a paste mold glassware making machine which includes a mounting block having a leaf spring mounted therein which urges a dowel member downwardly into engagement with a slot on the bottom plate.

7 Claims, 4 Drawing Figures

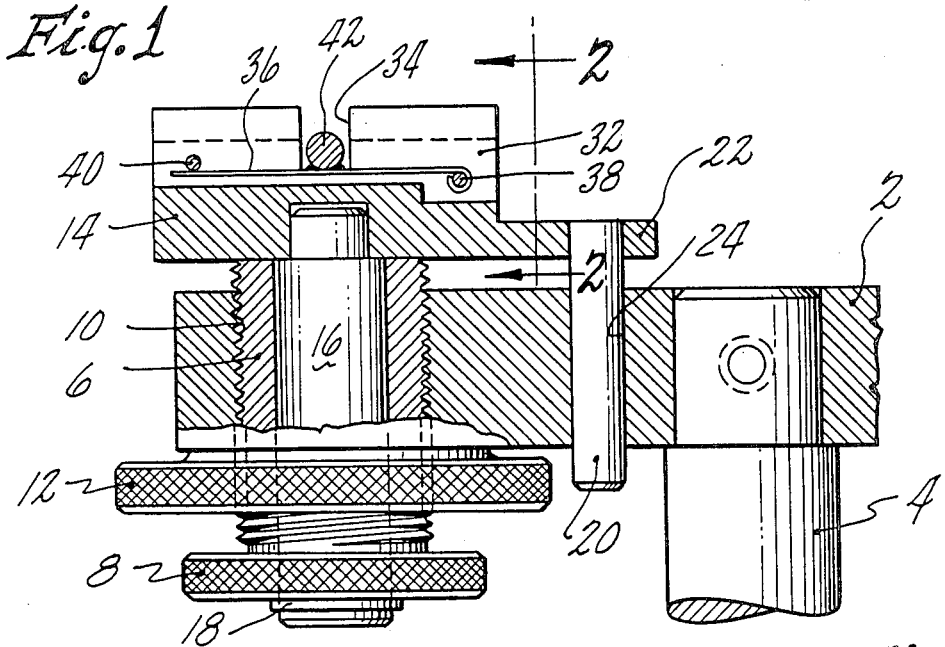
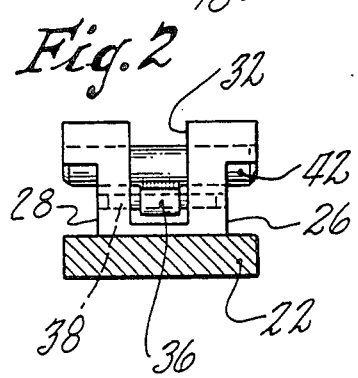
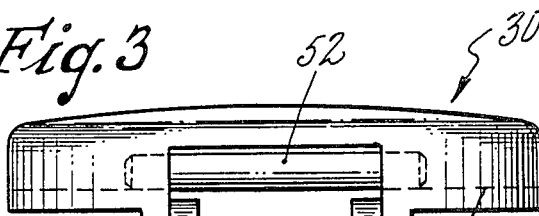
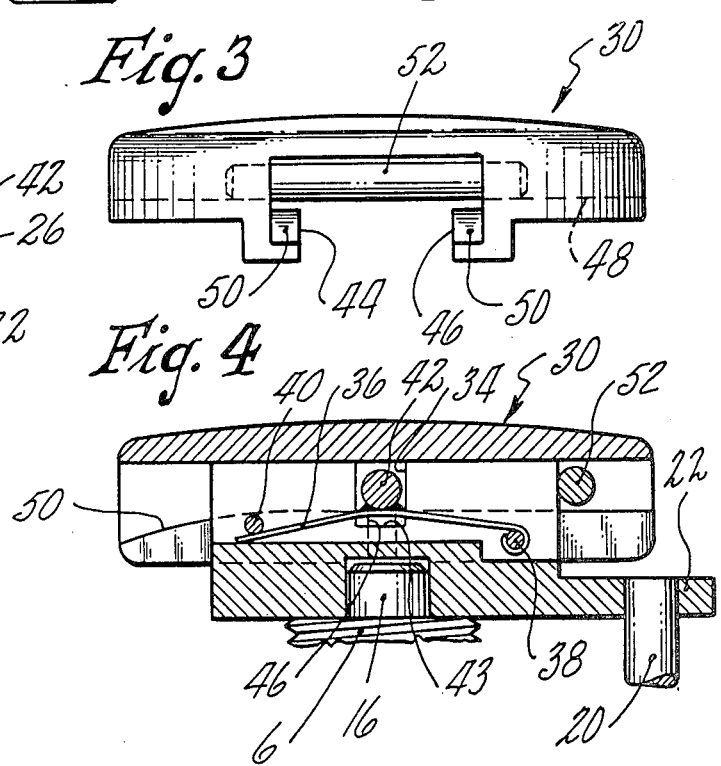

BOTTOM PLATE RETAINER

BACKGROUND OF THE INVENTION

This invention relates generally to an improved bottom plate retainer for mounting a bottom plate. More particularly, this invention relates to an improved bottom plate retainer for mounting a bottom plate to be used with a paste mold machine. An example as such a machine is shown in U.S. Pat. No. 1,979,211 which issued on Oct. 30, 1934 to G. E. Rowe. The paste mold machine shown in that patent is of the press and blow type and is a single table, continuous rotary motion machine having a plurality of individual forming units mounted for rotation about the axis of the machine. Machines of this type are commonly used in the glass industry today and are known as the "Emhart H-28 Machine." The type of machine shown in the U.S. Pat. No. 1,979,211 is a single gob machine. That is, at each forming unit, only one piece of ware is produced during a single cycle of each forming unit.

An improved version of this machine is disclosed in U.S. Pat. No. 4,339,264 issued to Francis A. Dahms on July 13, 1982, which patent is hereby incorporated by reference in this disclosure in its entirety. This type of machine shown in the patent is a double gob machine. That is, it forms two articles of ware during one cycle of each given forming unit.

In paste mold machines, a bottom plate is used in connection with the blow mold to provide a cavity in which the glass article is blown into its final shape. During the blowing operation, the parison is rotated as it is blown to provide seamless ware. If a design is provided in the bottom of the glass article, the bottom plates will also rotate. In other cases, the bottom plates are stationary. In the past, a non-rotating bottom plate was locked in place on the bottom plate retainer by means of a spring pin which engaged a groove in the bottom plate. The bottom plate included a hollow stud which was provided with an extension spring holding tension on the spring pin. The extension spring was held in place by a cotter pin. Due to the shock load when the bottom plate is retracted, the hollow stud was tending to wear out at the cotter pin and an extension spring tended to break.

SUMMARY OF THE INVENTION

In view of the above, it is an object of the present invention to provide an improved bottom plate retainer.

More particularly, it is an object of the present invention to provide an improved bottom plate retainer in which the wear and breakage of the parts is minimized.

These and other objects of the present invention may be achieved, according to the preferred embodiment of the present invention, through the provision of a bottom plate retainer for releasably retaining a bottom plate thereon. The retainer comprises a mounting block having an elongated slot. A leaf spring is mounted in the slot. A second slot extends transversely to said elongated slots. A dowel member is positioned in said second slot and is attached to the leaf spring so that the leaf spring urges said dowel member downwardly.

BRIEF DESCRIPTION OF THE DRAWINGS

FIG. 1 is a vertical sectional view of a bottom plate retainer constructed in accordance with the present invention.

FIG. 2 is a cross-sectional view taken along the lines 2—2 of FIG. 1.

FIG. 3 is an end view of a bottom plate.

FIG. 4 is a vertical sectional view showing a bottom plate mounted on the bottom plate retainer.

DETAILED DESCRIPTION

Referring to FIG. 1, the bottom plate retainer includes a cross bar 2 mounted on a central support screw 4. The support screw 4 may be mounted in an arm such as shown in U.S. Pat. No. 4,339,264 for actuation by a mechanism such as disclosed in that patent. It should be noted that in FIG. 1, only the left hand side of the cross bar and its associated mechanism is shown. The right hand side is the same as the left hand side to provide double gob operation.

A threaded hollow adjusting stud 6 having a knob portion 8 at one end is threadedly received in a bore 10 in the cross bar 2. A threaded locking knob 12 is mounted on the threaded stub 6 between the knob portion 8 and the bottom of the cross bar 2. A retaining block 14 is mounted on the upper end of the adjusting stud 6 and has a solid cylindrical post 16 extending through the hollow adjusting stud 6. The cylindrical post 16 may be attached to the mounting block 14 by means of silver brazing or the like. A retaining ring 18 is mounted on the cylindrical post 16 immediately below the knob portion 8 of the adjusting stud 6. A rod member 20 is attached to and extends downwardly from a tail portion 22 of the mounting block 14. The rod member 20 extends through a bore 24 in the cross bar 2. The rod member 20 prevents rotation of the mounting block 14 relative to the bracket 2.

Slots or grooves 26 and 28 are provided in the side walls of the retaining block 14 to provide a connection for the bottom plate 30. The mounting block 14 also has a slot 32 opening in from the top and extending along its axis of the elongation. Another slot 34 extending in from the top extends perpendicular to slot 32.

A leaf spring 36 is mounted in slot 32 having one end wrapped around roll pin 38 and its free end positioned under a roll pin 40. A dowel member 42 is attached to the spring 36 by welding or other means and extends perpendicular to the axis of elongation of the mounting block 14 in slot 34. The leaf spring 36 biases the dowel member 42 downwardly so that it normally abuts the bottom 43 of slot 34 when the bottom plate 30 is removed.

The bottom plate 30 is provided with opposed tongue portions 44 and 46 which are adapted to mate with the grooves 26 and 28 of the mounting block 14. The under side of the bottom plate 30 is provided with a slot 48 extending transversely to the tongue members 44 and 46. The slot 46 has a width which is less than the diameter of the dowel member 42. The upper surface of each of the tongue portions 44 and 46 is tapered downwardly at their forward end and as indicated at 50 of FIG. 4. A dowel member 52 is provided transverse to the tongue members 44 and 46.

The bottom plate 30 is mounted on the retaining block 14 by inserting the forward end of the tongue members 44 and 46 in the grooves 26 and 28 of the retaining block 14 so that the tapered portions 50 cam the dowel member 42 upwardly. The bottom plate 30 is inserted until the dowel member 52 abuts the end of the retaining block 14 and the dowel member 42 engages the slot 46 in the bottom plate 30, whereby the bottom plate 30 is releasably retained on the retaining block 14.

The bottom plate 30 may be adjusted in a vertical direction relative to the cross bar 2 by turning the knob portion 8 of adjusting stud 6 so that the stub is either raised or lowered relative to the cross bar 2. This moves the mounting bracket 14 up or down as desired and in turn moves the bottom plate 30. When proper adjustment has been made, locking knob 12 may be rotated tight against the bottom of the support bracket 2 to prevent inadvertent rotation of the adjusting stud 6.

While reference has been made above to a specific embodiment of the present invention, it will be apparent to those skilled in the art that various modifications and alterations may be made thereto without departing from the spirit of the present invention. Therefore, it is intended that the scope of this invention be ascertained by reference to the following claims.

What is claimed is:

1. A bottom plate retainer of a glassware forming machine for releasably retaining a bottom plate thereon, said retainer comprising a mounting block having an elongated slot, a leaf spring mounted in said slot, a second slot in said mounting block extending transversely to said elongated slot, a dowel member positioned in said second slot and attached to said leaf spring, said leaf spring urging said dowel member downwardly.

2. The bottom plate retainer of claim 1 further including two spaced roll pins mounted in said mounting blocks and extending transversely to said elongated slot, said leaf spring having one end coiled about one of said roll pins and its other end positioned under the other of said roll pins.

3. The bottom plate retainer of claim 1 further including a solid cylindrical post attached to and extending downwardly from said mounting blocks.

4. A bottom plate assembly of a glassware forming machine including at least one retainer comprising an elongated mounting block having grooves in its side portion in the direction of elongation, a first slot in said mounting block opening from the top and extending parallel to said grooves, a second slot extending transversely to said first slot, a leaf spring mounted in said first slot, a dowel member positioned in said second slot and attached to said leaf spring, said bottom plate being mounted on said retainer and including tapering tongue portions engaged in said grooves in said mounting block, a cross slot through said tapering tongue positions of lesser width than the diameter of said dowel member, said leaf spring urging said dowel member against said tapering tongues and partially into said cross slot.

5. A bottom plate assembly of claim 4 further including a crossbar having a centrally located support member for attaching the crossbar to an operating mechanism, two retainers, one attached to said crossbar on one side of said support member and the other being attached to said crossbar on the other side of said support member, and a bottom plate retainer mounted on each of said retainer.

6. The bottom plate assembly of claim 5 wherein each mounting block includes a solid cylindrical post for attaching said mounting block to said crossbar.

7. The bottom plate assembly of claim 6 including a threaded hollow adjusting stud associated with each retainer and extending through said crossbar, each post being mounted in an adjusting stud.

* * * * *